US011544532B2

(12) United States Patent
Puscas et al.

(10) Patent No.: US 11,544,532 B2
(45) Date of Patent: Jan. 3, 2023

(54) GENERATIVE ADVERSARIAL NETWORK WITH DYNAMIC CAPACITY EXPANSION FOR CONTINUAL LEARNING

(71) Applicant: SAP SE, Walldorf (DE)

(72) Inventors: Mihai Puscas, Berlin (DE); Moin Nabi, Berlin (DE); Tassilo Klein, Berlin (DE); Oleksiy Ostapenko, Berlin (DE)

(73) Assignee: SAP SE, Walldorf (DE)

( * ) Notice: Subject to any disclaimer, the term of this patent is extended or adjusted under 35 U.S.C. 154(b) by 492 days.

(21) Appl. No.: 16/711,134

(22) Filed: Dec. 11, 2019

(65) Prior Publication Data

US 2021/0097371 A1    Apr. 1, 2021

Related U.S. Application Data

(60) Provisional application No. 62/906,538, filed on Sep. 26, 2019.

(51) Int. Cl.
*G06N 3/08*    (2006.01)
*G06N 3/04*    (2006.01)
(Continued)

(52) U.S. Cl.
CPC ......... *G06N 3/0454* (2013.01); *G06K 9/6256* (2013.01); *G06K 9/6267* (2013.01); *G06N 3/08* (2013.01); *G06N 20/00* (2019.01)

(58) Field of Classification Search
CPC ...... G06N 3/0454; G06N 3/088; G06N 20/00; G06N 3/08; G06N 3/04; G06K 9/6262;
(Continued)

(56) References Cited

U.S. PATENT DOCUMENTS

2020/0160119 A1* 5/2020 Inakoshi .............. G06N 3/0472
2020/0242476 A1* 7/2020 Kim ........................ G06N 3/04
(Continued)

OTHER PUBLICATIONS

T. Lesort, H. Caselles-Dupré, M. Garcia-Ortiz, A. Stoian and D. Filliat, "Generative Models from the perspective of Continual Learning," 2019 International Joint Conference on Neural Networks (IJCNN), 2019, pp. 1-8, doi: 10.1109/IJCNN.2019.8851986. (Year: 2019).*

(Continued)

*Primary Examiner* — Li Liu
(74) *Attorney, Agent, or Firm* — Mintz Levin Cohn Ferris Glovsky and Popeo, P.C.

(57) ABSTRACT

A method may include training a machine learning model to perform a first task before training the machine learning model to perform the second task. The machine learning model includes a generator network and a discriminator network. The training includes training, based on a first training sample associated with the first task, the discriminator network to perform the first task. The generator network may be trained to generate a first synthetic training sample emulating the first training sample. The discriminator network trained to perform the first task may be reinitialized in order for the discriminator network to be trained, based on a second training sample, to perform the second task. The reinitialized discriminator network may be further retrained, based on the first synthetic training sample, to perform the first task. Related systems and articles of manufacture, including computer program products, are also provided.

17 Claims, 11 Drawing Sheets

(51) Int. Cl.
*G06K 9/62* (2022.01)
*G06N 20/00* (2019.01)

(58) Field of Classification Search
CPC .. G06K 9/6257; G06K 9/6215; G06K 9/6267; G06V 10/82; G06V 40/172; G06T 2207/20081; G06T 2207/20084
See application file for complete search history.

(56) References Cited

U.S. PATENT DOCUMENTS

| | | | |
|---|---|---|---|
| 2021/0019632 A1* | 1/2021 | Rostami | G06N 3/088 |
| 2021/0241119 A1* | 8/2021 | Takahashi | G06N 3/088 |

OTHER PUBLICATIONS

Wu, Yue, et al. "Incremental classifier learning with generative adversarial networks." arXiv preprint arXiv:1802.00853 (2018). (Year: 2018).*

Aljundi, R. et al., "Memory aware synapses: Learning what (not) to forget," CoRR, abs/1711.09601, 2017. URL http://arxiv.org/abs/1711.09601.

Chaudhry, A. et al., "Riemannian walk for incremental learning: Understanding forgetting and intransigence," CoRR, abs/1801.10112, 2018. URL http://arxiv.org/abs/1801.10112.

Cichon, J. et al., "Branch-specific dendritic ca2+ spikes cause persistent synaptic plasticity," Nature, 520(7546):180-185, 2015.

Courbariaux, M. et al., "Training deep neural networks with binary weights during propagations," arxiv preprint. arXiv preprint arXiv:1511.00363, 2015.

French, R.M., "Catastrophic forgetting in connectionist networks," Trends in cognitive sciences, 3(4):128-135, 1999.

Gulrajani, I. et al., "Improved training of wasserstein gans," In Advances in Neural Information Processing Systems, pp. 5767-5777, 2017.

Hayashi-Takagi, A. et al., "Labelling and optical erasure of synaptic memory traces in the motor cortex," Nature, 525(7569):333, 2015.

Heusel, M. et al., "Gans trained by a two time-scale update rule converge to a nash equilibrium," arXiv preprint arXiv:1706.08500, 2017.

Kamra, N. et al., "Deep generative dual memory network for continual learning," arXiv preprint arXiv:1710.10368, 2017.

Kemker, R. et al., "Fearnet: Brain-inspired model for incremental learning," arXiv preprint arXiv:1711.10563, 2017.

Kirkpatrick, J. et al., "Overcoming catastrophic forgetting in neural networks," CoRR, abs/1612.00796, 2016. URL http://arxiv.org/abs/1612.00796.

Krizhevsky, A. et al., "The cifar-10 dataset," online: http://www.cs.toronto.edu/kriz/cifar.html, 2014.

LeCun, Y. The mnist database of handwritten digits. http://yann.lecun.com/exdb/mnist/, 1998.

Li, Z. et al., "Learning without forgetting," CoRR, abs/1606.09282, 2016. URL http://arxiv.org/abs/1606.09282.

Mallya, A. et al., "Piggyback: Adding multiple tasks to a single, fixed network by learning to mask," arXiv preprint arXiv:1801.06519, 2018.

Mancini, M. et al., "Adding new tasks to a single network with weight transformations using binary masks," arXiv preprint arXiv:1805.11119, 2018.

Mayford, M. et al., "Synapses and memory storage," Cold Spring Harbor perspectives in biology, pp. a005751, 2012.

McCloskey, M. et al., "Catastrophic interference in connectionist networks: The sequential learning problem," vol. 24 of Psychology of Learning and Motivation, pp. 109-165. Academic Press, 1989. doi: https://doi.org/10.1016/S0079-7421(08)60536-8.

Netzer, Y. et al., "Reading digits in natural images with unsupervised feature learning," In NIPS workshop on deep learning and unsupervised feature learning, vol. 2011, pp. 9, 2011.

Nguyen, C.V. et al., "Variational continual learning," arXiv preprint arXiv:1710.10628, 2017.

Odena, A et al., "Conditional image synthesis with auxiliary classifier GANs," arXiv preprint arXiv:1610.09585, 2016.

Radford, A. et al., "Unsupervised representation learning with deep convolutional generative adversarial networks," arXiv preprint arXiv:1511.06434, 2015.

Ratcliff, R. "Connectionist models of recognition memory: Constraints imposed by learning and forgetting functions," Psychological Review, pp. 285-308, 1990.

Rebuffi, S-A. et al., "icarl: Incremental classifier and representation learning," CoRR, abs/1611.07725, 2016. URL http://arxiv/org/abs/1611.07725.

Seff, A. et al., "Continual learning in generative adversarial nets," arXiv preprint arXiv:1705.08395, 2017.

Serra, J. et al., "Overcoming catastrophic forgetting with hard attention to the task," CoRR, abs/1801.01423, 2018. URL http://arxiv.org/abs/1801.01423.

Shin, H. et al., "Continual learning with deep generative replay," In Advances in Neural Information Processing Systems, pp. 2990-2999, 2017.

Wu, C. et al., "Memory Replay GANs: learning to generate images from new categories without forgetting," In Advances In Neural Information Processing Systems, 2018.

Yoon, J. et al., "Lifelong learning with dynamically expandable networks," https://arxiv.org/abs/1708.01547, 2018.

Zenke, F. et al., "Improved multitask learning through synaptic intelligence," CoRR, abs/1703.04200, 2017. URL http://arxiv.org/abs/1703.04200.

* cited by examiner

GENERATIVE ADVERSARIAL NETWORK WITH DYNAMIC CAPACITY EXPANSION FOR CONTINUAL LEARNING

CROSS REFERENCE TO RELATED APPLICATION

This application claims priority to U.S. Provisional Application No. 62/906,538, filed on Sep. 26, 2019 and entitled "DYNAMIC GENERATIVE MEMORY FOR CONTINUAL LEARNING," the disclosure of which is incorporated herein by reference in its entirety.

TECHNICAL FIELD

The subject matter described herein relates generally to machine learning and more specifically to the training of a machine learning model.

BACKGROUND

Machine learning models may be trained to perform a variety of cognitive tasks including, for example, object identification, natural language processing, information retrieval, speech recognition, and/or the like. A deep learning model such as, for example, a neural network, may be trained to perform a classification task by at least assigning input samples to one or more categories. The deep learning model may be trained to perform the classification task based on training data that has been labeled in accordance with the known category membership of each sample included in the training data. Alternatively and/or additionally, the deep learning model may be trained to perform a regression task. The regression task may require the deep learning model to predict, based at least on variations in one or more independent variables, corresponding changes in one or more dependent variables.

SUMMARY

Systems, methods, and articles of manufacture, including computer program products, are provided for continual learning. In one aspect, there is provided a system. The system may include at least one data processor and at least one memory. The at least one memory may store instructions that result in operations when executed by the at least one data processor. The operations may include: training a machine learning model to perform a first task and a second task, the machine learning being trained to perform the first task before the machine learning model is trained to perform the second task, the machine learning model including a generator network and a discriminator network, and the training of the machine learning model including training, based at least on a first training sample associated with the first task, the discriminator network to perform the first task, training the generator network to generate a first synthetic training sample emulating the first training sample associated with the first task, and reinitializing the discriminator network trained to perform the first task, the discriminator network being reinitialized in order for the discriminator network to be trained, based at least on a second training sample, to perform the second task, the reinitialized discriminator network further being retrained, based at least on the first synthetic training sample, to perform the first task; and deploying the trained machine learning model to perform the first task and the second task.

In some variations, one or more of the features disclosed herein including the following features can optionally be included in any feasible combination. The discriminator network may be further trained to differentiate between the first synthetic training sample and the first training sample. The generator network may be trained, based at least on an output of the discriminator network, to generate the first synthetic training sample such that the discriminator network is unable to differentiate between the first synthetic training sample and the first training sample.

In some variations, the generator network may be further trained to generate a second synthetic training sample emulating the second training sample associated with the second task. The generator network may be configured to generate a binary mask identifying a first neuron in the generator network as being reserved for the first task. The training of the generator network to generate the second synthetic training sample may include changing a state of a second neuron in the generator network in response to the binary mask identifying the first neuron in the generator network as being reserved for the first task.

In some variations, the state of the second neuron may be changed further in response to the binary mask identifying the second neuron as a free neuron.

In some variations, a capacity of the generator network may be expanded by at least adding the second neuron in response to the binary mask indicating that no free neurons are available in the generator network.

In some variations, changing the state of the second neuron may include adjusting one or more weights applied by the second neuron in order to minimize a difference in between the second synthetic training sample generated by the generator network and the second training sample associated with the second task.

In some variations, the training of the generator network to generate the second synthetic training sample may include reusing the first neuron without changing a state of the first neuron.

In some variations, the generator network may generate the first synthetic training sample and the second synthetic training sample without storing the first training sample associated with the first task or the second training sample associated with the second task.

In some variations, the first task and the second task may be classification tasks.

In some variations, the machine learning model may be a generative adversarial network having the generator network and the discriminator network.

In another aspect, there is provided a method for continual learning. The method may include: training a machine learning model to perform a first task and a second task, the machine learning being trained to perform the first task before the machine learning model is trained to perform the second task, the machine learning model including a generator network and a discriminator network, and the training of the machine learning model including training, based at least on a first training sample associated with the first task, the discriminator network to perform the first task, training the generator network to generate a first synthetic training sample emulating the first training sample associated with the first task, and reinitializing the discriminator network trained to perform the first task, the discriminator network being reinitialized in order for the discriminator network to be trained, based at least on a second training sample, to perform the second task, the reinitialized discriminator network further being retrained, based at least on the first synthetic training sample, to perform the first task; and deploying the trained machine learning model to perform the first task and the second task.

In some variations, one or more of the features disclosed herein including the following features can optionally be included in any feasible combination. The discriminator network may be further trained to differentiate between the first synthetic training sample and the first training sample. The generator network may be trained, based at least on an output of the discriminator network, to generate the first synthetic training sample such that the discriminator network is unable to differentiate between the first synthetic training sample and the first training sample.

In some variations, the generator network may be further trained to generate a second synthetic training sample emulating the second training sample associated with the second task. The generator network may be configured to generate a binary mask identifying a first neuron in the generator network as being reserved for the first task. The training of the generator network to generate the second synthetic training sample may include changing a state of a second neuron in the generator network in response to the binary mask identifying the first neuron in the generator network as being reserved for the first task.

In some variations, the state of the second neuron may be changed further in response to the binary mask identifying the second neuron as a free neuron.

In some variations, the method may further include expanding a capacity of the generator network by at least adding the second neuron in response to the binary mask indicating that no free neurons are available in the generator network.

In some variations, changing the state of the second neuron may include adjusting one or more weights applied by the second neuron in order to minimize a difference in between the second synthetic training sample generated by the generator network and the second training sample associated with the second task.

In another aspect, there is provided a computer program product that includes a non-transitory computer readable storage medium. The non-transitory computer-readable storage medium may include program code that causes operations when executed by at least one data processor. The operations may include: training a machine learning model to perform a first task and a second task, the machine learning being trained to perform the first task before the machine learning model is trained to perform the second task, the machine learning model including a generator network and a discriminator network, and the training of the machine learning model including training, based at least on a first training sample associated with the first task, the discriminator network to perform the first task, training the generator network to generate a first synthetic training sample emulating the first training sample associated with the first task, and reinitializing the discriminator network trained to perform the first task, the discriminator network being reinitialized in order for the discriminator network to be trained, based at least on a second training sample, to perform the second task, the reinitialized discriminator network further being retrained, based at least on the first synthetic training sample, to perform the first task; and deploying the trained machine learning model to perform the first task and the second task.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1A:
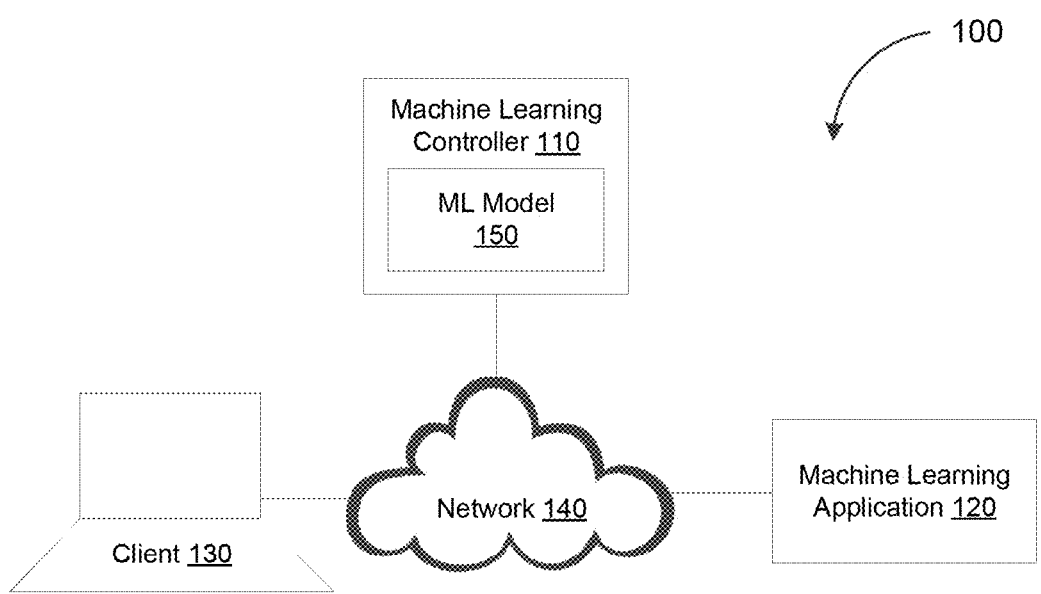
FIG. 1A depicts a system diagram illustrating an example of a machine learning system, in accordance with some example embodiments.

A machine learning model may be trained to perform a task by being exposed to a corresponding corpus of labeled training samples, each of which including data (e.g., text, image, and/or the like) and at least one ground-truth label corresponding to a correct label for the data. Training the machine learning model may include adjusting the machine learning model to minimize the errors present in the output of the machine learning model. For example, training the machine learning model may include adjusting the weights applied by the machine learning model in order to minimize a quantity of incorrect labels assigned by the machine learning model. Nevertheless, although a conventional machine learning model may be successfully trained to perform a first task, it may be unable to learn from additional training samples associated with a second task while maintaining the parameters learned for the first task. For instance, subjecting the machine learning model to additional training, including by exposing the machine learning model to training samples associated with the second task, may diminish the performance of the machine learning model for the first task and/or the second task.

In some example embodiments, a machine learning model may be implemented as a generative adversarial network having a generator network and a discriminator network operating in tandem to ensure that the machine learning model is able to learn incrementally to perform multiple tasks. Moreover, the capacity of the generator network may expand, for example, through the addition of neurons, to accommodate knowledge that is acquired with the learning of additional tasks. By including the generative adversarial network having an adaptive network capacity, the machine learning model may avoid the phenomenon of catastrophic forgetting, which may occur when a conventional machine learning model is trained to perform multiple tasks.

A conventional machine learning model may be incapable of learning continuously to perform multiple tasks because the neurons of the conventional machine learning model lack plasticity. Instead of locking to a state to retain the parameters learned for a first task, the state of the neurons in a conventional machine learning model may vary when the machine learning model is exposed to training samples associated with a second task. Moreover, a conventional machine learning model may have a fixed capacity. Thus, then the quantity of available neurons becomes depleted, the state of neurons already configured for one task may be altered in order to accommodate additional tasks. This lack of plasticity and scalability may result in catastrophic forgetting, in which the exposure to training samples associated with a subsequent task supplants the knowledge that the machine learning model had already acquired for one or more previously learned task. In some example embodiments, the inclusion of the generative adversarial network having an adaptive network capacity may lend plasticity as well as scalability to the machine learning model such that the machine learning model is able to learn continuously to perform multiple tasks.

As noted, the generative adversarial network included in the machine learning model may include a generator network and a discriminator network. In some example embodiments, the generator network may be trained to generate synthetic training samples that emulate the actual training samples used to train the discriminator network to perform the first task. Meanwhile, the discriminator network may be trained based on the synthetic training samples generated by the generator network and training samples associated with a second task such that the machine learning model is able to learn the second task without forgetting the first task. For example, the discriminator network may be trained to differentiate between a synthetic training sample associated with the first task and an actual training sample associated with the second task. Subsequent to being trained to perform the first task, the discriminator network may be reinitialized before being trained, based on training samples associated with the second task, to perform the second task. In addition to being trained to perform the second task, the discriminator network may be retrained, based on synthetic training samples associated with the first task, to perform the first task.

In some example embodiments, as part of generating synthetic training samples for training the discriminator network, the generator network may be configured to memorize a data distribution associated with the first task without storing the actual training samples associated with the first task. For example, the generator network may generate a binary mask identifying parameters of the generator network that may not be modified when the generator network encounters additional training samples associated with the second task. The binary mask may lend plasticity to the generator network. For instance, although a neuron in the generator network configured for the first task may be reused for the second task, the binary mask may prevent the state of that neuron from being changed when the generator network encounters training samples associated with the second task. Instead, if the training associated with the second task requires changing the state of the neuron, these changes may be applied to a different neuron in the generator network that the binary mask indicates as being free.

Furthermore, in some example embodiments, the capacity of the generator network may expand in order to accommodate knowledge that is acquired with the learning of additional tasks. For example, the capacity of the generator network may expand to include additional neurons if the binary mask indicates that no existing neurons may be modified based on the training samples associated with the second task. As such, the state of the neurons configured for the first task may remain fixed while changes corresponding to the second task may be applied to the additional neurons added to the generator network.

FIG. 1A depicts a system diagram illustrating an example of a machine learning system 100, in accordance with some example embodiments. Referring to FIG. 1A, the machine learning system 100 may include a machine learning controller 110, a machine learning application 120, and a client 130. The machine learning controller 110, the machine learning application 120, and the client 130 may be communicatively coupled via a network 140. It should be appreciated that the client 130 may be a processor-based device including, for example, a smartphone, a tablet computer, a wearable apparatus, a virtual assistant, an Internet-of-Things (IoT) appliance, and/or the like. The network 140 may be any wired network and/or a wireless network including, for example, a wide area network (WAN), a local area network (LAN), a virtual local area network (VLAN), a public land mobile network (PLMN), the Internet, and/or the like.

The machine learning controller 110 may incrementally train a machine learning model 150 to perform multiple tasks. For example, the machine learning controller 110 may train the machine learning model 150 to perform a first task before training the machine learning model 150 to perform a second task. Examples of the first task and the second task may include object identification tasks, natural language processing tasks, information retrieval tasks, speech recognition tasks, and/or the like. As used here, the machine learning model 150 may be trained to perform an individual "task" by being exposed to a corresponding corpus of training samples. For instance, the machine learning model 150 may be trained to perform the first task based on a first corpus of training samples and the second task based on a second corpus of training samples. When the machine learning model 150 is trained "incrementally" to perform the first task and the second task, the first corpus of training samples is not available when the machine learning model 150 trained to perform the first task is subsequently being trained to perform the second task. The trained machine learning model 150 may be deployed to perform the first task and the second task in order to implement one or more functionalities of the machine learning application 120.

For instance, the machine learning application 120 may be a machine learning based communication application such as, for example, a chatbot, an issue tracking system, and/or the like. As such, the trained machine learning model 150 may be deployed to perform various natural language processing tasks that includes determining a sentiment, a topic, and/or an intent of text received at the machine learning application 120. The result of the natural language processing tasks may enable the machine learning application 120 to further determine an appropriate response to the text received at the machine learning application 120.

Figure 1B:
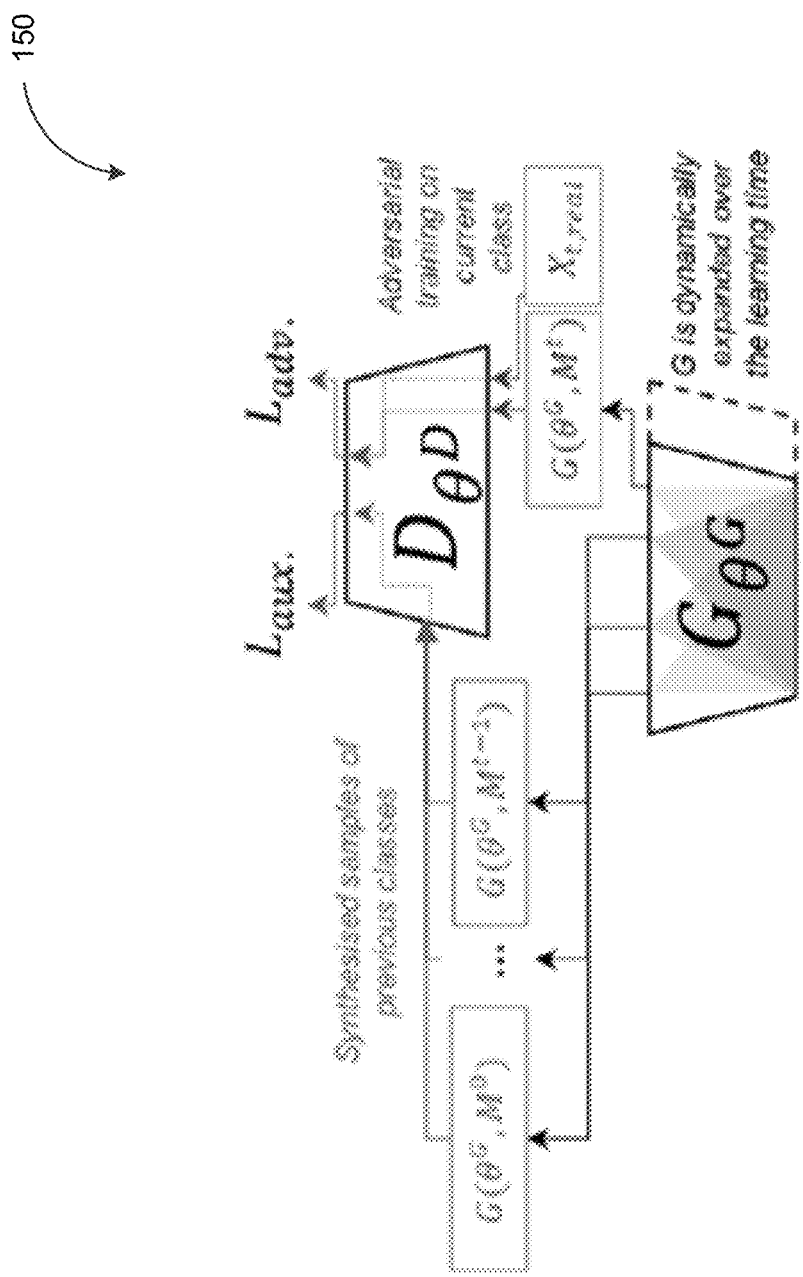
FIG. 1B depicts a block diagram illustrating an example of a machine learning model, in accordance with some example embodiments.

In some example embodiments, the machine learning model 150 may be a generative adversarial network with adaptive network capacity. The plasticity and scalability of the machine learning model 150 may enable the machine learning model 150 to learn incrementally, for example, to perform the second task after the first task without forgetting the first task. To further illustrate, FIG. 1B depicts a block diagram illustrating an example of the machine learning model 150, in accordance with some example embodiments. As shown in FIG. 1B, the machine learning model 150 may be a generative adversarial network that includes a generator network $G_{\theta^G}$ and a discriminator network $D_{\theta^D}$.

In some example embodiments, training the machine learning model 150 may include jointly training the generator network $G_{\theta^G}$ and the discriminator network $D_{\theta^D}$ incrementally to perform, for example, the first task before the second task. For example, the training samples associated with an individual task $k \in K$ may be denoted as $D_k = \{(x_i^k, y_i^k)\}_{i=1}^{n^k}$, wherein $x_i^k \in X$ may denote a single training sample and $y_i^k \in y^k$ may denote the ground truth labels associated with the training sample. In order to train the machine learning model 150 to perform each of the K quantity of tasks incrementally, the training samples $D_k$ associated with each individual task may become available to the machine learning model 150 continuously and progressively instead of all at once. For instance, while the machine learning model 150 is being trained to perform a first task $k_1$, the training samples $D_k$ may include training samples associated with the first task $k_1$ and/or originating from a single class. That is, the ground truth labels $y_i^k \in y^k$ of the training samples $D_k$ may exclude labels belonging to other tasks such as, for example, a second task $k_2$. Nevertheless, when deployed for testing and/or for production, the output space $Y^k = \cup_{j=1}^k y^j$ of the machine learning model 150 may span all off the labels encountered by the machine learning model 150, including labels belonging to multiple tasks such as the first task $k_1$ and the second task $k_2$.

In order to learn each individual task $k \in K$ incrementally, the machine learning model 150 may, at each time t, learn the parameters $\theta$ of a predictive model $f\theta: X \rightarrow Y^t$, wherein $Y^t = \cup_{j=1}^t y^j$ may denote all of the labels encountered by the machine learning model 150 thus far. Learning the parameters $\theta$ of the predictive model $f\theta: X \rightarrow Y^t$ may require solving the problem expressed as Equation (1) below.

$$\min_{\theta} \mathcal{L}(\theta, D_t) + \Omega(\theta) \qquad (1)$$

wherein t may denote a task index, $\mathcal{L}$ may denote the loss function, and $\Omega(\theta)$ may correspond to a regularization term.

If the training samples $D_t = \{(x^k, y^t)\}$ of a task t includes only a single class of labels (e.g., $|\{y\}|=1$), then the loss function cannot be computed without referring to classes from training samples already encountered by the machine learning model 150. Nevertheless, storing any training samples may violate a strictly incremental training setup. Accordingly, in some example embodiments, the generator network $G_{\theta^G}$ may be configured to generate synthetic training samples that emulate the actual training samples already encountered by the discriminator network $D_{\theta^D}$, for example, while the discriminator network $D_{\theta^D}$ was trained to perform one or more previously learned tasks. Meanwhile, the discriminator network $D_{\theta^D}$ may be trained to differentiate between synthetic training samples and actual training samples such that the output of the discriminator network $D_{\theta^D}$ may be used to train the generator network $G_{\theta^G}$ adversarially to generate synthetic training samples that emulate actual training samples. For example, the generator network $G_{\theta^G}$ may be trained adversarially to generate synthetic training samples that the differentiator network $D_{\theta^D}$ is incapable of differentiating from actual training samples.

According to some example embodiments, the generator network $G_{\theta^G}$ may be configured to generate a binary mask M identifying parameters in the generator network $G_{\theta^G}$ that cannot be modified when the generator network $G_{\theta^G}$ trained to generate synthetic training samples for the first task $k_1$ is subsequently trained to generate synthetic training samples for the second task $k_2$. The binary mask M may lend plasticity to the generator network $G_{\theta^G}$ including by preventing the state of neurons configured for the first task $k_1$ from being changed when the generator network $G_{\theta^G}$ encounters training samples associated with the second task $k_2$. For example, if the training associated with the second task $k_2$ requires changing the state of a neuron the binary mask indicates as reserved for the first task $k_1$, these changes may be applied to a different neuron in the generator network $G_{\theta^G}$ that the binary mask indicates as being free.

Training the generator network $G_{\theta^G}$ to generate synthetic training samples that emulate actual training samples associated with the first task $k_1$ may include performing a stochastic gradient descent that includes determining a gradient of an error function (e.g., mean squared error (MSE), cross entropy, and/or the like) associated with the generator network $G_{\theta^G}$. The gradient of the error function associated with the generator network $G_{\theta^G}$ may be determined, for example, by backward propagating the error in an output of the generator network $G_{\theta^G}$, which may correspond to a difference between a synthetic training sample generated by the generator network $G_{\theta^G}$ and an actual training sample associated with the first task $k_1$. Meanwhile, the error in the output of the generator network $G_{\theta^G}$ may be minimized by at least updating one or more weights applied by the neurons in the generator network $G_{\theta^G}$ until the gradient of the error function converges, for example, to a local minimum and/or another threshold value.

The state of a neuron configured for the first task $k_1$ may include one or more weights applied to the inputs of the neuron before the inputs are passed through an activation function associated with the neuron. Preserving the state of the neuron may therefore include preventing the weights applied by the neuron from being changed when the generator network $G_{\theta^G}$ is subsequently trained to generate synthetic training samples that emulate actual training samples associated with the second task $k_2$. For example, training the generator network $G_{\theta^G}$ to generate synthetic training samples that emulate actual training samples associated with the second task $k_2$ may include minimizing the error in the output of the generator network $G_{\theta^G}$ by adjusting the weights applied by the neurons in the generator network $G_{\theta^G}$. Instead of adjusting the weights of any neuron indiscriminately, the binary mask M may identify neurons that are reserved for the first task $k_1$ such that the state of these neurons remain unchanged by the training associated with the second task $k_2$. As such, weight adjustments necessitated by the training associated with the second task $k_2$ may be applied, based on the binary mask M, to free neurons included in the generator network $G_{\theta^G}$.

In some example embodiments, each stochastic gradient descent step t may include learning the binary mask $M^t = [m_1^t, \ldots, m_l^t]$ based on the previous layer's activations of the generator network $G_{\theta^G}$. The binary mask $M_t$ may subsequently be modulated with the layer activation to yield an output for a fully connected layer l expressed by Equation (2) below.

$$y_l^t = m_l^t \odot (W_l x) \quad (2)$$

wherein $m_l^t$ may denote an n-element vector and $W_l$ may denote a weight matrix between layer l and l–1 shaped as an m×n matrix.

Referring again to FIG. 1B, the discriminator network $D_{\theta^D}$ may be trained to differentiate between the synthetic training samples generated by the generator network $G_{\theta^G}$ to emulate training samples associated with previously learned tasks such as the first task $k_1$ and actual training samples associated with a current task such as the second task $k_2$. The discriminator network $D_{\theta^D}$ may be further trained to perform the first task $k_1$ and the second task $k_2$ including, for example, by assigning labels belonging to the first task $k_1$ and the second task $k_2$. In some example embodiments, the discriminator network $D_{\theta^D}$ may be reinitialized for every task k before being trained for a current task as well as the previously learned tasks. For example, subsequent to being trained to perform the first task $k_1$, the discriminator network $D_{\theta^D}$ may be reinitialized before being trained, based on training samples associated with the second task $k_2$, to perform the second task $k_2$. In addition to being trained to perform the second task $k_2$, the discriminator network $D_{\theta^D}$ may be retrained, based on synthetic training samples associated with the first task $k_1$, to perform the first task $k_1$.

In some example embodiments, to generate the binary mask M, the generator network $G_{\theta^G}$ may apply real valued mask embedding $e_l^t$, which may be scaled by a positive scaling parameter s, and passed through a threshold function $\sigma(x) \in [0,1]$. As such, the binary mask M generated by the generator network $G_{\theta^G}$ may be given as $m_l^t = \sigma(se_l^t)$. A sigmoid function may be applied as a pseudo step-function such in order to ensure a gradient flow to train the mask embedding $e_l^t$. Meanwhile, the scaling parameters may control the degree of binarization of the mask M. For example, the value of s may be directly proportional to the degree of binarization (e.g., $m_l^t \to \{0,1\}$ for $s \to \infty$, $m_l^t \to 0.5$ for $s \to 0$). Over the course of training, the scaling parameters may be incrementally annealed from 0 to $s_{max}$ in accordance with Equation (3) below.

$$s = \frac{1}{s_{max}} + \left(s_{max} - \frac{1}{s_{max}}\right)\frac{i-1}{I-1} \quad (3)$$

wherein i may correspond to a current training epoch and I may correspond to the total quantity of training epochs.

In order to avoid overwriting of the knowledge associated with previously learned tasks when the generator network $G_{\theta^G}$ is trained for additional tasks, the gradients $g_l$ of the weights of each layer l may be multiplied by the inverse of the cumulated binary masks for all previously learned tasks as shown by Equations (4) and (5) below.

$$m_l^{\leq t} = \max(m_l^t, m_l^{t-1}) \quad (4)$$

$$m_l^{\leq t} = \max(m_l^t, m_l^{t-1}) \quad (5)$$

wherein $g'_l$ may correspond to a new weight gradient and $m_{l,m \times n}^{\leq t}$ may denote a cumulated mask expanded to the shape of $g_l$ (e.g., n times duplication of $m^{\leq t}$ to match sizes).

In the cumulated attention mask $m_{l,m \times n}^{\leq t}$, the neurons that are important for the previously learned tasks may be masked with a first value (e.g., "1" or a value close to "1") to indicate these neurons as reserved for the previously learned tasks. Contrastingly, free neurons that can be modified during training for subsequent tasks may be masked with a second value (e.g., "0"). Although neurons reserved for previously learned tasks (e.g., neurons masked with the first value in the cumulated attention mask $m_{l,m \times n}^{\leq t}$) may still be reused during training for subsequent tasks, it should be appreciated that the state of the reserved neurons (e.g., the weights applied by the reserved neurons) may not be modified. The higher the sparsity of the cumulated attention mask $m_{l,m \times n}^{\leq t}$, the higher the quantity of neurons that may be available for modification during subsequent training.

In some example embodiments, sparsity of the cumulated attention mask $m_{l,m \times n}^{\leq t}$ may be promoted by adding a regularization term $R^t$ to the loss function $L_G$ of the generator network $G_{\theta^G}$ as shown in Equation (6) below. The regularization term $R^t$ may be added in order to increase the efficiency in the allocation of neurons across various tasks.

$$R^t(M^t, M^{t-1}) = \frac{\sum_{l=1}^{L-1} \sum_{i=1}^{N_l} m_{l,i}^t (1 - m_{l,i}^{<t})}{\sum_{l=1}^{L-1} \sum_{i=1}^{N_l} 1 - m_{l,i}^{<t}} \quad (6)$$

wherein $N_l$ may denote the quantity of neurons of the layer l. Neurons reserved for previously learned tasks may not be subject to regularization whereas free neurons may be subject to regularization. Accordingly, the addition of the regularization term $R^t$ to the loss function $L_G$ may increase the efficiency of neuron allocation across different tasks including by promoting the reuse of reserved neurons over the allocation of free neurons.

As noted, in some example embodiments, the generator network $G_{\theta^G}$ and the discriminator network $D_{\theta^D}$ may be jointly trained such that the generator network $G_{\theta^G}$ and the discriminator network $D_{\theta^D}$ may operate in tandem to ensure that the machine learning model 150 is able to learn incrementally to perform multiple tasks including, for example, the first task $k_1$ followed by the second task $k_2$. For example, the generator network $G_{\theta^G}$ may be trained to generate synthetic training samples that emulate the training samples associated with one or more previously learned tasks (e.g., the first task $k_1$). Meanwhile, the discriminator network $D_{\theta^D}$ may be trained to differentiate between the synthetic training samples and actual training samples such that the output of the discriminator network $D_{\theta^D}$ may be used to train the generator network $G_{\theta^G}$ adversarially to generate synthetic training samples that the differentiator network $D_{\theta^D}$ is incapable of differentiating from actual training samples. Moreover, the discriminator network $D_{\theta^D}$ may be trained to perform additional tasks based on actual training samples associated with the additional tasks while being retrained to perform the previously learned tasks based on the synthetic training samples generated by the generator network $G_{\theta^G}$.

For example, using task labels as conditions, the generator network $G_{\theta^G}$ may learn from a training set $X_t = \{X_1^t, \ldots, X_N^t\}$ to generate synthetic training samples for a task $t$ previously learned by the discriminator network $D_{\theta^D}$. The synthetic training samples generated by the generator network $G_{\theta^G}$ may be expressed by Equation (7) below.

$$x_t = G_{\theta_G^t}(t, z, M_t) \quad (7)$$

wherein $\theta_G^t$ may denote the parameters of the generator network $G_{\theta^G}$ configured for the task $t$, $z$ may denote a random noise vector, and $M_t$ may denote the computed binary mask for the task $t$.

To train the generator network $G_{\theta^G}$ adversarially, the discriminator $D_{\theta^D}$ may be trained to perform a discriminative task that includes determining whether a training sample $x_f$ is synthetic training sample generated by the generator network $G_{\theta^G}$ or an actual training sample. The discriminator network $D_{\theta^D}$ may also be trained to perform a classification task in which the discriminator network $D_{\theta^D}$ determines whether the training sample $x_f$ may be labelled as part of the task $t$. To achieve both, the final layer of the discriminator network $x_f$ may include a first branch corresponding to the discriminative task and a second branch corresponding to the classification task. The base network added to each layer may be parameterized with $\theta_H^t$ and $\theta_C^t$, respectively. The parameters corresponding to the three tasks, $\theta_G^t$, $\theta_H^t$, $\theta_C^t$, may be optimized in an alternating fashion. Accordingly, the training of the machine learning model 150, including the joint training of the generator network $G_{\theta^G}$, may be an optimization problem that requires minimizing Equation (8) below.

$$\mathcal{L}_G + \mathcal{L}_s^t - \mathcal{L}_c^t + \lambda_{RU} R^t \quad (8)$$

wherein $\mathcal{L}_c$ may denote a classification error on the auxiliary output, $\mathcal{L}_s$ may denote a discriminative loss function used on the binary output layer of the network, and $\lambda_{RU} R^t$ may correspond to the regularization term $R^t$ included in in Equation (6).

To promote efficient allocation of neuron in the generator network $G_{\theta^G}$ including those already reserved for previously learned tasks, the regularization weight $\lambda$ may be multiplied by the ratio $$\alpha = \frac{S_t}{S_{free}},$$

wherein $S_t$ may denote the size of the generator network $G_{\theta^G}$ prior to the training associated with the task $t$, and $S_{free}$ may denote the quantity of free neurons remaining in the generator network $G_{\theta^G}$. The ratio $\alpha$ may ensure that less neurons are reused during the beginning stages of training and more neurons are reused during the later stages of training.

Figure 4:
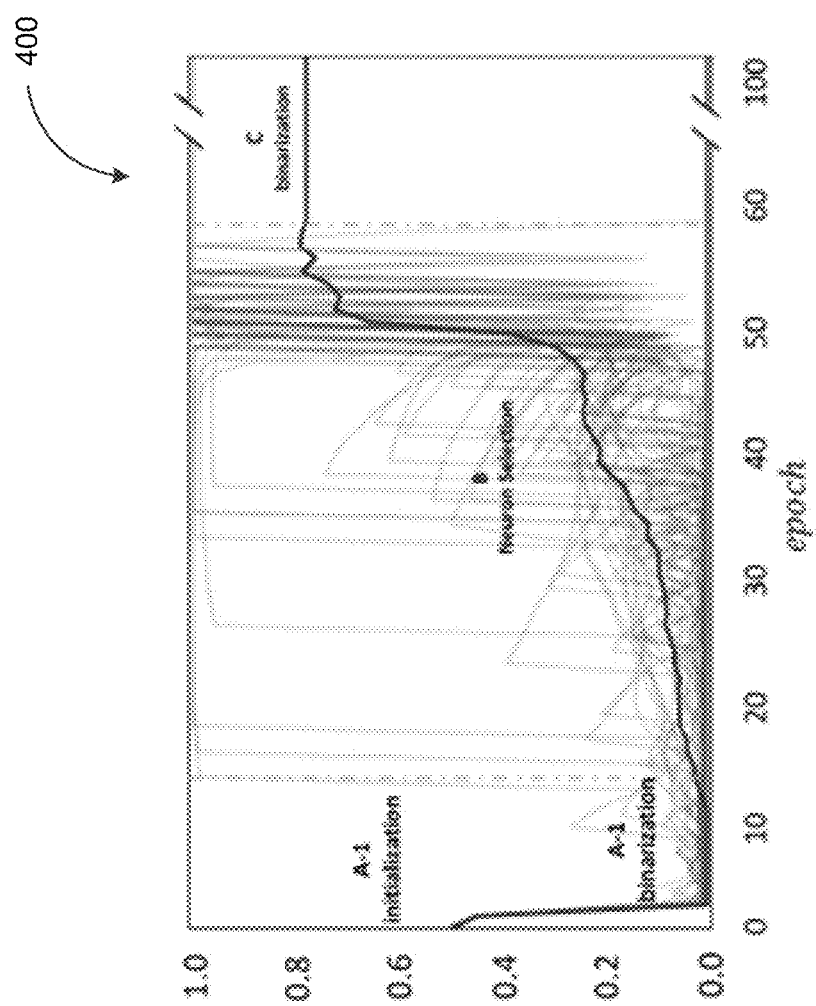
FIG. 4 depicts a graph illustrating a change in a capacity of a machine learning model during training, in accordance with some example embodiments.

For a given task $t$, its corresponding binary mask $M_t$ may be initialized with the scaling parameter $s=0$. As observed in the graph 400 depicted in FIG. 4, at task initialization, the binary mask $M_t$ may be completely non-binary, with no new neurons set aside for learning a new task. However, as the training of the generator network $G_{\theta^G}$ progresses for the given task (e.g., over successive training epochs), the scaling parameters and regularization scaling parameter $\lambda$ may increase and become annealed. With heavy regularization and increasing binarization, the generator network $G_{\theta^G}$ may be encouraged to minimize the quantity of reserved neurons, as illustrated in region (A-2) of the graph 400.

But with most mask values near 0, the ability of the generator network $G_{\theta^G}$ to acquire new knowledge may be greatly curtailed. An optimization process may push the binary mask $M_t$ to become less binary so that neurons may have better mobility, and a "short-term" memory may be formed as a result. For example, the quantity of mask values corresponding to free neurons may be steadily increased with the binarization bias, a trend observed in region (B) of the graph 400 as the standard deviation of the mask values corresponding to each neuron. This behavior may be seen as a state transition in which the generator network $G_{\theta^G}$ selects and reserves the neurons that are most representative of previously learned tasks while other neurons are left free for learning subsequent tasks.

Figure 5:
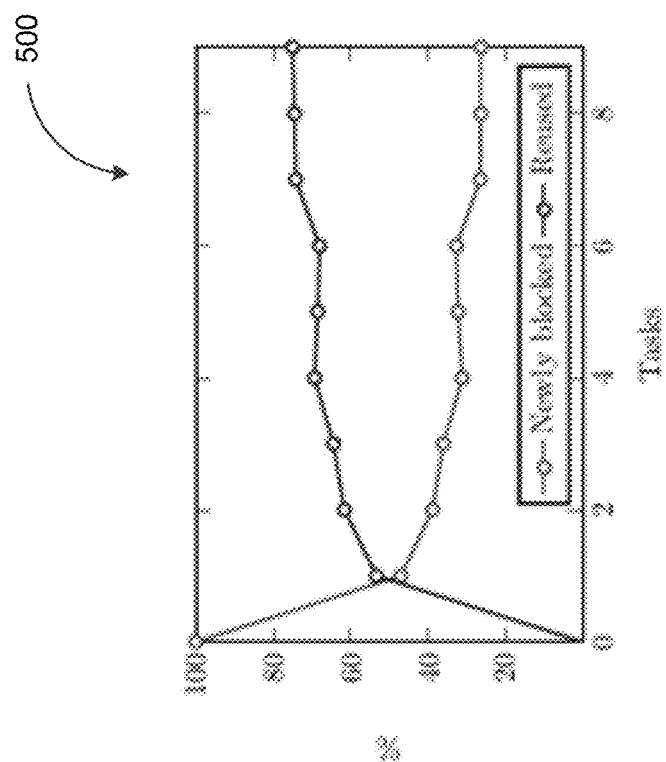
FIG. 5 depicts a graph illustrating a change in a capacity of a machine learning model, in accordance with some example embodiments.

Accordingly, for a given task $t$, the neurons in the generator network $G_{\theta^G}$ may be divided into three categories: (i) free neurons that are not used at all (U) and may thus be considered as free capacity for the generator network $G_{\theta^G}$, (ii) neurons that are reserved for the task $t$ (NB), (iii) neurons reserved for previously learned tasks and are being reused for the task $t$ without being changed (R). FIGS. 5A-B depict the evolution of the ratio of free neurons (NB) and reused neurons (R) relative to the total quantity of neurons in the generator network $G_{\theta^G}$. As shown graph 500 in FIG. 5 shows, the ratio of reused neurons (R) may be increasing across successive tasks whereas the ratio of reserved neurons may be decreasing across successive tasks. These trends may indicate that the generator network $G_{\theta^G}$ may be learning to generalize better over successive tasks, thus enabling a more efficient allocation of neurons for each successive task.

Figure 6:
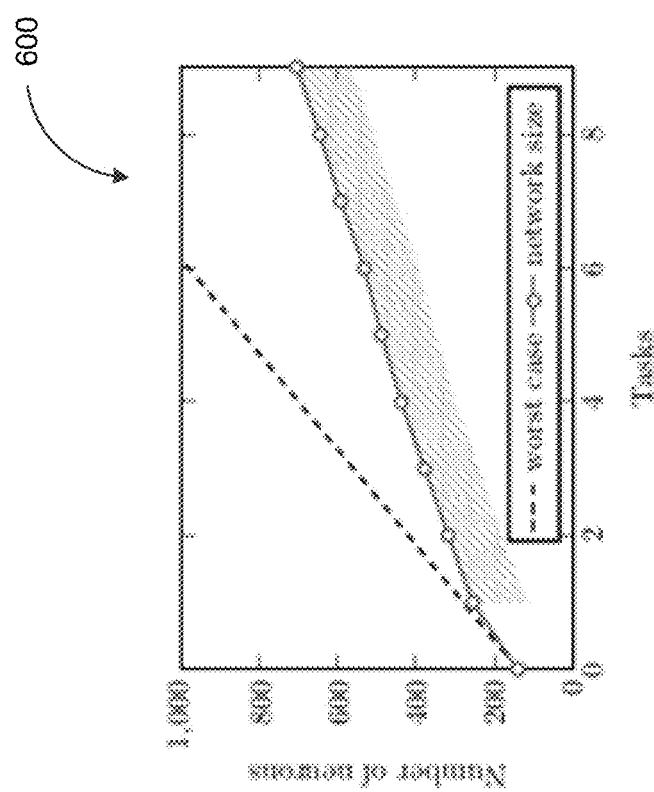
FIG. 6 depicts a graph illustrating a change in a capacity of a machine learning model, in accordance with some example embodiments.

Nevertheless, one issue with reserving the representative neurons of each task is that the generator network $G_{\theta^G}$ may eventually run out of capacity. As such, in some example embodiments, the capacity of the generator network $G_{\theta^G}$ may expand in order to maintain a constant quantity $N_{free}$ of free neurons. This may be achieved by expanding the generation network $G_{\theta^G}$ after each task with a quantity of reserved neurons denoted as NB(t). The growth of the generator network $G_{\theta}^G$ may therefore be linked to how efficiently neurons are being reserved for each task, the latter being further dependent on how well the generator network $G_{\theta}^G$ is able to generalize from previously learned tasks. FIG. 6 depicts a graph 600 comparing the efficiency of growing the capacity of the generator network $G_{\theta}^G$ in the aforementioned manner to a worst case scenario in which a same quantity of neurons $N_{init}$ is added to the generator network $G_{\theta}^G$ for every task.

As noted, the discriminator network $D_{\theta}^D$ may be trained jointly with the generator network $G_{\theta}^G$ to differentiate between synthetic training samples and actual training samples as well as to perform various tasks. Accordingly, the training of the discriminator network $D_{\theta}^D$ may also be an optimization problem that includes minimizing Equation (9) below.

$$\mathcal{L}_D = \mathcal{L}_c^t - \mathcal{L}_s^t + \lambda_{GP} \mathcal{L}_{gp}^t \qquad (9)$$

wherein $\mathcal{L}_{gp}^t$ may denote a gradient penalty term to ensure a more stable training process.

The more significant the domain shift between the training samples associated with different tasks, the quicker the capacity of the generator network $G_{\theta}^G$ may become exhausted and the sooner the effects of catastrophic forgetting may begin to manifest. This may be attributed to the overall decline in the sparsity of the accumulated mask $m_l^{\leq t}$ as the machine learning model 150 is exposed incrementally to training samples associated with different tasks. In order to avoid this effect, the sparsity of the binary mask may be kept substantially the same for each training cycle t.

For example, a layer l of the generator network $G_{\theta}^G$ may be associated with an input vector of size m and an output vector of size n. At the beginning of an initial training cycle for a task t based on the corresponding training samples $D_0$, the binary mask $m_l$ may be initialized at size n, with zero sparsity. That is, all neurons in the layer l may be available for use, with all n values of the binary mask $m_l$ set to a value of 0.5 (e.g., real-valued embeddings e are initialized with 0).

After the initial training cycle with the regularization term $R^0$, the sparsity of the binary mask $m_l$ may decrease to $n-\delta_t$, wherein $\delta_t$ may correspond to the quantity of neurons reserved for the task t. In order to avoid exhausting the capacity of the generator network $G_{\theta}^G$, the capacity of the generator network $G_{\theta}^G$ may be expanded subsequent to the initial training cycle. For example, the quantity of neurons in the layer l of the generator network $G_{\theta}^G$ may be expanded by $$\frac{\delta_t}{m}$$

in order to guarantee that the capacity of the layer l (e.g., the quantity of free neurons that may be modified to accommodate additional tasks) is kept constant at n for each successive learning cycle during which the generator network $G_{\theta}^G$ is exposed to an additional task.

The classification accuracy of the machine learning model 150, implemented as a generative adversarial network having the jointly trained generator network $G_{\theta}^G$ and discriminator network $D_{\theta}^D$ may exceed that of conventional machine learning models. For example, the classification accuracy of the machine learning model 150 in a strictly incremental setup may be measured on various benchmark datasets including, for example, the Modified National Institute of Standards and Technology (MNIST) database, the Street View House Number (SVHN) dataset, and the Canadian Institute for Advanced Research (CIFAR-10) collection. Table 1 below depicts a quantitative comparison of the performance of the machine learning model 150 and other machine learning architectures. As shown in Table 1, the machine learning model 150 may outperform even machine learning model with access to previously observed training samples.

TABLE 1

| Method | MNIST | | SVHN | | CIFAR10 | |
|---|---|---|---|---|---|---|
| | $A_{10}$ (%) | $A_5$ (%) | $A_{10}$ (%) | $A_5$ (%) | $A_{10}$ (%) | $A_5$ (%) |
| iCarl-S (Rebuffi et al., 2016) | — | 55.8 | — | — | — | — |
| EWC-S (Kirkpatrick et al., 2016) | — | 79.7 | — | — | — | — |
| RWalk-S (Chaudhry et al., 2018) | — | 82.5 | — | — | — | — |
| PI-S (Zenke et al., 2017) | — | 78.7 | — | — | — | — |
| EWC-M (Seff et al., 2017) | 77.03 | 70.62 | 33.02 | 39.84 | — | — |
| DGR-M (Shin et al., 2017) | 85.4 | 90.39 | 47.28 | 61.29 | — | — |
| MeRGAN-M (Wu et al., 2018) | 97.0 | 98.19 | 66.78 | 80.90 | — | — |
| Joint Training | 98.1 | 97.66 | 84.82 | 85.30 | 64.2 | 82.2 |
| DGM (ours) | 99.17 | 98.14 | 68.36 | 84.18 | 50.8 | 62.5 |

Figure 2A:
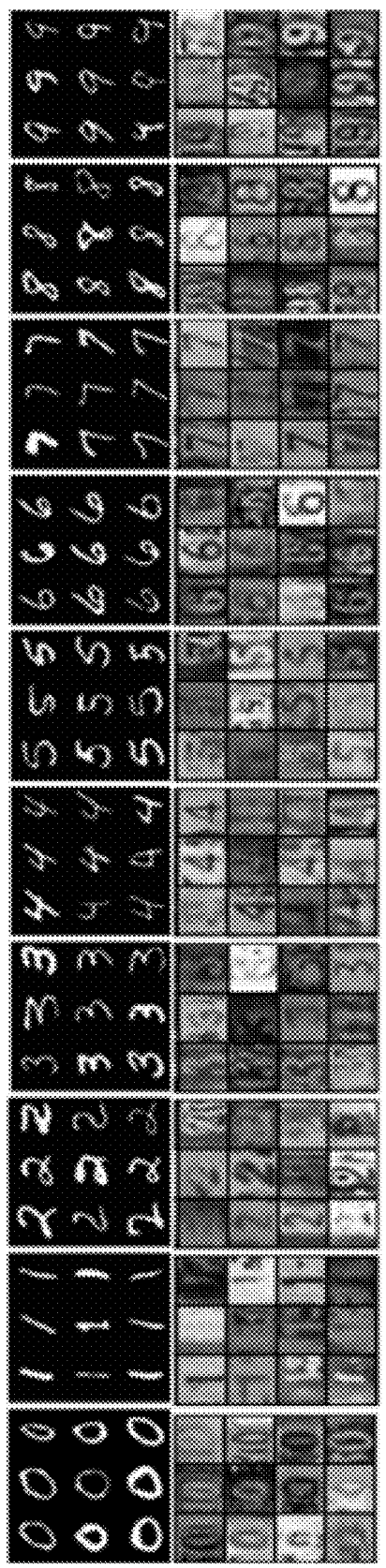
FIG. 2A depicts examples of images generated by a machine learning model trained incrementally to perform multiple tasks, in accordance with some example embodiments.
Figure 2B:
FIG. 2B depicts additional examples of images generated by a machine learning model trained incrementally to perform multiple tasks, in accordance with some example embodiments.
Figure 3A:
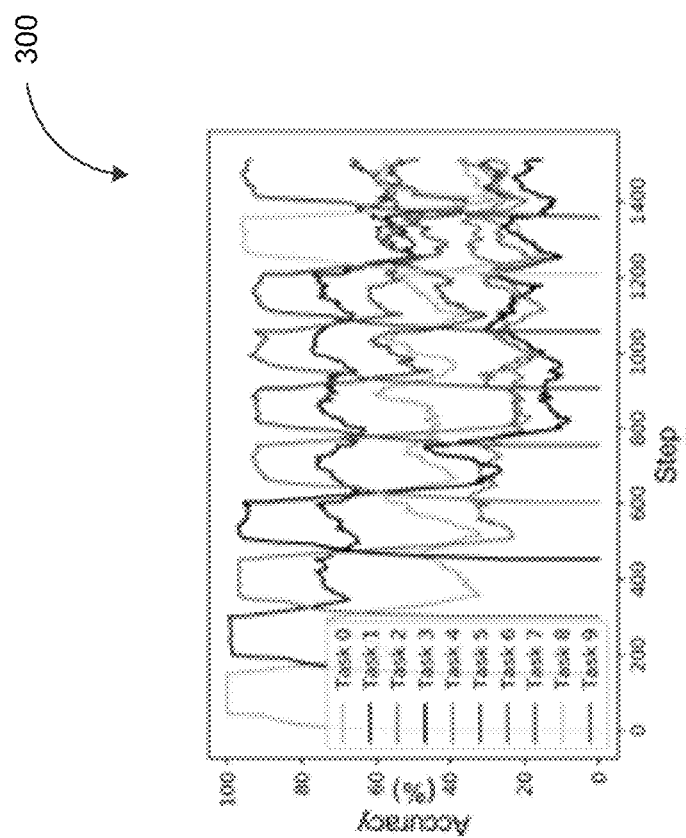
FIG. 3A depicts a graph illustrating a change in a classification accuracy of a machine learning model trained incrementally to perform multiple classification tasks, in accordance with some example embodiments.
Figure 3B:
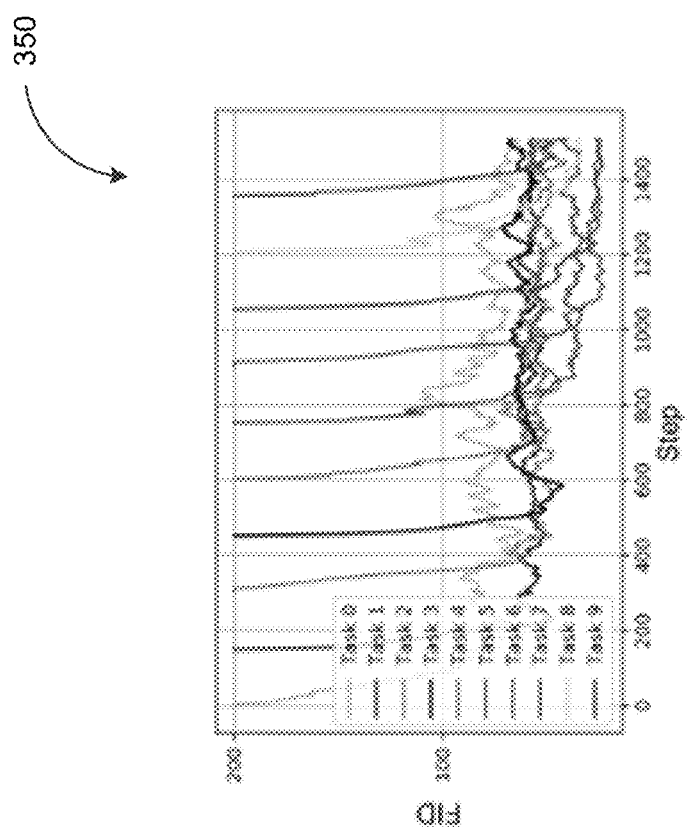
FIG. 3B depicts a graph illustrating a change in a perceptual quality of images generated by a machine learning model trained incrementally to perform multiple image generation tasks, in accordance with some example embodiments.

The performance of the machine learning model 150 may be evaluated for different types of tasks. For example, FIGS. 2A-B depict examples of images generated by the machine learning model 150 trained incrementally to perform multiple tasks, in accordance with some example embodiments. FIG. 3A depicts a graph 300 illustrating a change in the classification accuracy of the machine learning model 150 as the machine learning model 150 is trained incrementally to perform multiple classification tasks. Meanwhile, FIG. 3B depicts a graph 350 illustrating a change in the perceptual quality of images generated by the machine learning model 150 as the machine learning model 150 is trained incrementally to perform multiple image generation tasks. It should be appreciated that in FIG. 3B, the perceptual quality of images generated by the incrementally trained machine learning model 150 may be assessed based on a Frechet Inception Distance (FID) metric. Moreover, as shown in FIGS. 3A-B, the performance of the machine learning model 150 does not deteriorate as the machine learning model 150 is trained incrementally to perform different tasks.

Figure 7:
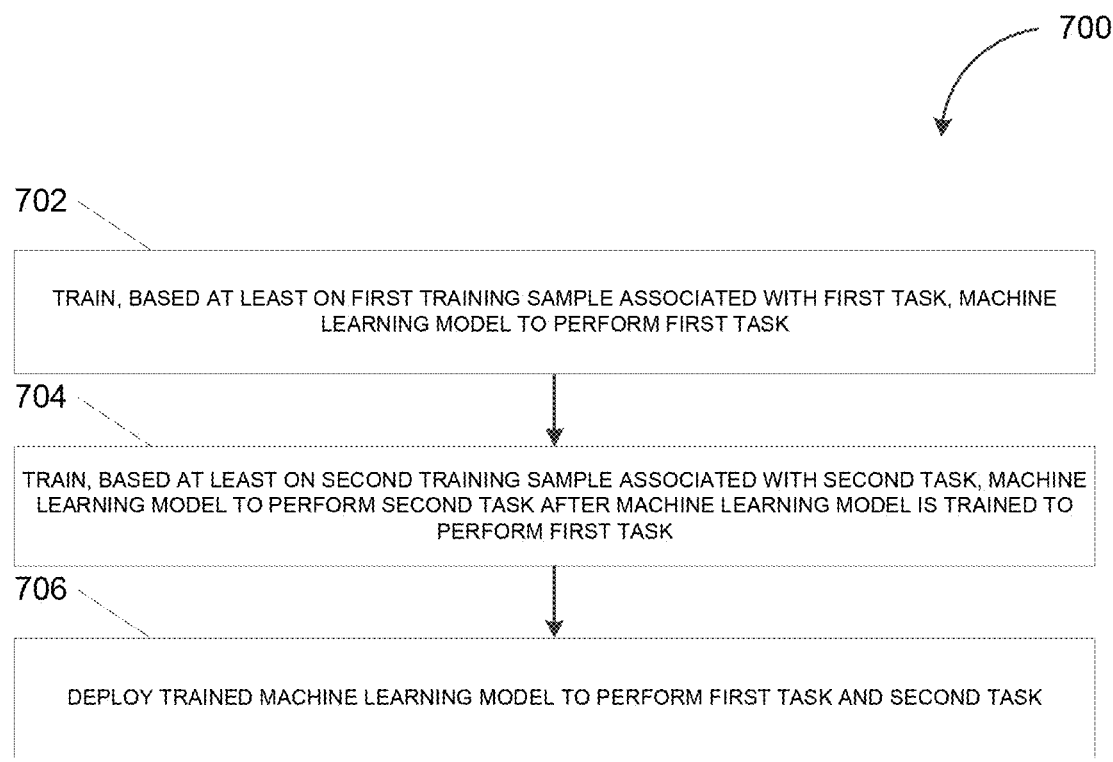
FIG. 7 depicts a flowchart illustrating a process for incrementally training a machine learning model, in accordance with some example embodiments.

FIG. 7 depicts a flowchart illustrating a process 700 for incrementally training a machine learning model, in accordance with some example embodiments. Referring to FIGS. 1A-B and 7, the process 700 may be performed by the machine learning controller 110, for example, to incrementally train the machine learning model 150 to perform a succession of different tasks.

At 702, the machine learning controller 110 may train, based at least on a first training sample associated with a first task, the machine learning model 150 to perform the first task. For example, the machine learning controller 110 may train, based at least on training samples associated with the first task $k_1$, the discriminator network $D_{\theta^D}$ included in the machine learning model 150 to perform the first task $k_1$. In some example embodiments, the machine learning model 150 may be trained in a strictly incremental setup such that the training samples associated with the first task $k_1$ are not stored. Accordingly, to avoid catastrophic forgetting in which the discriminator network $D_{\theta^D}$ forgets knowledge associated with the first task $k_1$ when the discriminator network $D_{\theta^D}$ is subsequently trained to perform a second task $k_2$, training the machine learning model 150 may include training the generator network $G_{\theta^G}$ to generate synthetic training samples emulating the actual training samples associated with the first task $k_1$.

In some example embodiments, in addition to being trained to perform the first task $k_1$, the discriminator network $D_{\theta^D}$ may be further trained to differentiate between synthetic training samples generated by the generator network $G_{\theta^G}$ and actual training samples. The output of the discriminator network $D_{\theta^D}$ may therefore be used to train the generator network $G_{\theta^G}$ adversarially to generate synthetic training samples that emulate actual training samples. For example, the generator network $G_{\theta^G}$ may be trained adversarially to generate synthetic training samples that the differentiator network $D_{\theta^D}$ is incapable of differentiating from actual training samples.

At 704, the machine learning controller 110 may train, based at least on a second training sample associated with a second task, the machine learning model 150 to perform the second task after the machine learning model 150 is trained to perform the first task. In some example embodiments, subsequent to being trained for the first task $k_1$, the discriminator network $D_{\theta^D}$ may be reinitialized before being trained, based on training samples associated with the second task $k_2$, to perform the second task $k_2$. In addition to being trained to perform the second task $k_2$, the discriminator network $D_{\theta^D}$ may also be retrained, based on the synthetic training samples generated by the generator network $G_{\theta^G}$ for first task $k_1$, to perform the first task $k_1$. While the discriminator network $D_{\theta^D}$ is trained to perform the second task $k_2$ based on training samples associated with the second task $k_2$, the generator network $G_{\theta^G}$ may be further trained to generate synthetic training samples that emulate the actual training samples associated with the second task $k_2$ such that the discriminator network $D_{\theta^D}$ may subsequently be retrained to perform the second task $k_2$.

In some example embodiments, in order to avoid catastrophic forgetting in which knowledge associated with the second task $k_2$ supplants knowledge associated with the first task $k_1$, the generator network $G_{\theta^G}$ may generate a binary mask M identifying neurons in the generator network $G_{\theta^G}$ that cannot be modified when the generator network $G_{\theta^G}$ trained to generate synthetic training samples for the first task $k_1$ is subsequently trained to generate synthetic training samples for the second task $k_2$. The binary mask M may lend plasticity to the generator network $G_{\theta^G}$ including by preventing the state of neurons configured for the first task $k_1$ from being changed when the generator network $G_{\theta^G}$ is exposed to training samples associated with the second task $k_2$. For example, if the training associated with the second task $k_2$ requires changing the state of a neuron the binary mask indicates as reserved for the first task $k_1$, these changes may be applied to a different neuron in the generator network $G_{\theta^G}$ that the binary mask indicates as being free. In the event no free neurons are available in the generator network $G_{\theta^G}$, the capacity of the generator network $G_{\theta^G}$ may expand, for example, through the addition of neurons, in order to accommodate the changes necessitated by the second task $k_2$.

At 706, the machine learning controller 110 may deploy the trained machine learning model 150 to perform the first task and the second task. For example, the machine learning model 150 may be deployed to perform the first task and the second task in order to implement one or more functionalities of the machine learning application 120. Examples of the first task and the second task may include object identification tasks, natural language processing tasks, information retrieval tasks, speech recognition tasks, and/or the like. For instance, the machine learning application 120 may be a machine learning based communication application such as, for example, a chatbot, an issue tracking system, and/or the like. As such, the trained machine learning model 150 may be deployed to perform various natural language processing tasks that includes determining a sentiment, a topic, and/or an intent of text received at the machine learning application 120. The result of the natural language processing tasks may enable the machine learning application 120 to further determine an appropriate response to the text received at the machine learning application 120.

Figure 8:
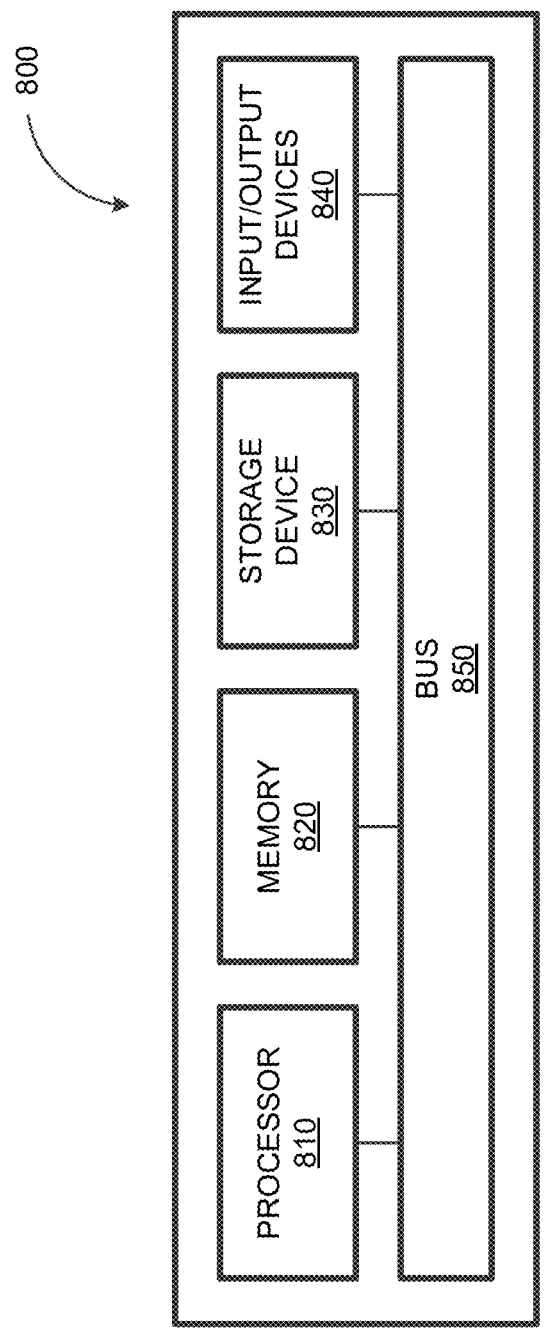
FIG. 8 depicts a block diagram illustrating a computing system, in accordance with some example embodiments.

FIG. 8 depicts a block diagram illustrating a computing system 800, in accordance with some example embodiments. Referring to FIGS. 1A-B and 8, the computing system 800 can be used to implement the machine learning controller 110 and/or any components therein.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of, for example, the machine learning controller 110. In some implementations of the current subject matter, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, or a tape device, or other suitable persistent storage means. The input/output device 840 provides input/output operations for the computing system 800. In some implementations of the current subject matter, the input/output device 840 includes a keyboard and/or pointing device. In various implementations, the input/output device 840 includes a display unit for displaying graphical user interfaces.

According to some implementations of the current subject matter, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some implementations of the current subject matter, the computing system 800 can be used to execute various interactive computer software applications that can be used for organization, analysis and/or storage of data in various (e.g., tabular) format (e.g., Microsoft Excel®, and/or any other type of software). Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
  at least one data processor; and
  at least one memory storing instructions which, when executed by the at least one data processor, result in operations comprising:
    training a machine learning model to perform a first task and a second task, the machine learning model being trained to perform the first task before the machine learning model is trained to perform the second task, the machine learning model including a generator network and a discriminator network, and the training of the machine learning model including
    training, based at least on a first training sample associated with the first task, the discriminator network to perform the first task,
    training the generator network to generate a first synthetic training sample emulating the first training sample associated with the first task and a second synthetic training sample emulating a second training sample associated with the second task, the generator network configured to generate a binary mask identifying a first neuron in the generator network as being reserved for the first task to prevent the first neuron from being modified when the generator network is trained to generate the second synthetic training sample emulating the second training sample associated with the second task, and reinitializing the discriminator network trained to perform the first task, the discriminator network being reinitialized in order for the discriminator network to be trained, based at least on the second training sample, to perform the second task, the reinitialized discriminator network further being retrained, based at least on the first synthetic training sample, to perform the first task; and applying the trained machine learning model to perform the first task and the second task.

2. The system of claim 1, wherein the discriminator network is further trained to differentiate between the first synthetic training sample and the first training sample, and wherein the generator network is trained, based at least on an output of the discriminator network, to generate the first synthetic training sample such that the discriminator network is unable to differentiate between the first synthetic training sample and the first training sample.

3. The system of claim 1, wherein the training of the generator network to generate the second synthetic training sample includes changing a state of a second neuron in the generator network in response to the binary mask identifying the first neuron in the generator network as being reserved for the first task.

4. The system of claim 3, wherein the state of the second neuron is changed further in response to the binary mask identifying the second neuron as a free neuron.

5. The system of claim 3, further comprising expanding a capacity of the generator network by at least adding the second neuron in response to the binary mask indicating that no free neurons are available in the generator network.

6. The system of claim 3, wherein changing the state of the second neuron includes adjusting one or more weights applied by the second neuron in order to minimize a difference in between the second synthetic training sample generated by the generator network and the second training sample associated with the second task.

7. The system of claim 1, wherein the training of the generator network to generate the second synthetic training sample includes reusing the first neuron without changing a state of the first neuron.

8. The system of claim 1, wherein the generator network generates the first synthetic training sample and the second synthetic training sample without storing the first training sample associated with the first task or the second training sample associated with the second task.

9. The system of claim 1, wherein the first task and the second task comprise classification tasks.

10. The system of claim 1, wherein the machine learning model comprises a generative adversarial network having the generator network and the discriminator network.

11. A computer-implemented method, comprising:

training a machine learning model to perform a first task and a second task, the machine learning model being trained to perform the first task before the machine learning model is trained to perform the second task, the machine learning model including a generator network and a discriminator network, and the training of the machine learning model including training, based at least on a first training sample associated with the first task, the discriminator network to perform the first task, training the generator network to generate a first synthetic training sample emulating the first training sample associated with the first task and a second synthetic training sample emulating a second training sample associated with the second task, the generator network configured to generate a binary mask identifying a first neuron in the generator network as being reserved for the first task to prevent the first neuron from being modified when the generator network is trained to generate the second synthetic training sample emulating the second training sample associated with the second task, and reinitializing the discriminator network trained to perform the first task, the discriminator network being reinitialized in order for the discriminator network to be trained, based at least on the second training sample, to perform the second task, the reinitialized discriminator network further being retrained, based at least on the first synthetic training sample, to perform the first task; and applying the trained machine learning model to perform the first task and the second task.

12. The method of claim 11, wherein the discriminator network is further trained to differentiate between the first synthetic training sample and the first training sample, and wherein the generator network is trained, based at least on an output of the discriminator network, to generate the first synthetic training sample such that the discriminator network is unable to differentiate between the first synthetic training sample and the first training sample.

13. The method of claim 11, wherein the training of the generator network to generate the second synthetic training sample includes changing a state of a second neuron in the generator network in response to the binary mask identifying the first neuron in the generator network as being reserved for the first task.

14. The method of claim 13, wherein the state of the second neuron is changed further in response to the binary mask identifying the second neuron as a free neuron.

15. The method of claim 13, further comprising expanding a capacity of the generator network by at least adding the second neuron in response to the binary mask indicating that no free neurons are available in the generator network.

16. The method of claim 13, wherein changing the state of the second neuron includes adjusting one or more weights applied by the second neuron in order to minimize a difference in between the second synthetic training sample generated by the generator network and the second training sample associated with the second task.

17. A non-transitory computer readable medium storing instructions, which when executed by at least one data processor, result in operations comprising:

training a machine learning model to perform a first task and a second task, the machine learning model being trained to perform the first task before the machine learning model is trained to perform the second task, the machine learning model including a generator network and a discriminator network, and the training of the machine learning model including training, based at least on a first training sample associated with the first task, the discriminator network to perform the first task, training the generator network to generate a first synthetic training sample emulating the first training sample associated with the first task and a second synthetic training sample emulating a second training sample associated with the second task, the generator network configured to generate a binary mask identifying a first neuron in the generator network as being reserved for the first task to prevent the first neuron from being modified when the generator network is trained to generate the second synthetic training sample emulating the second training sample associated with the second task, and reinitializing the discriminator network trained to perform the first task, the discriminator network being reinitialized in order for the discriminator network to be trained, based at least on the second training sample, to perform the second task, the reinitialized discriminator network further being retrained, based at least on the first synthetic training sample, to perform the first task; and applying the trained machine learning model to perform the first task and the second task.

* * * * *